Patented Sept. 10, 1946

2,407,412

UNITED STATES PATENT OFFICE 2,407,412

THERAPEUTIC SOLUTIONS

Douglas V. Frost, Waukegan, Ill., assignor to Abbott Laboratories, North Chicago, Ill., a corporation of Illinois No Drawing. Application August 15, 1942, Serial No. 454,919

10 Claims. (Cl. 167—81)

The present invention relates to improved therapeutic solutions and more particularly to stabilized riboflavin-nicotinamide solutions. The present application is a continuation-in-part of my prior application Serial No. 433,871.

Riboflavin is a naturally occurring representative of the polyhydroxyisoalloxazine vitamins and its deficiency is widespread. Clinical symptoms of polyhydroxyisoalloxazine deficiency include keratitis, cheilosis, mydriasis, photophobia, etc.

Riboflavin is only very slightly soluble in water and hypodermical administration in this form necessitates the use of large volumes of liquid. The natural solubility of riboflavin in pure water at 20° C., for example, is only about 0.013 per cent and the administration of a good therapeutic dose (10 mg.) at this temperature necessitates the injection of about 78 cc. of solution.

In my co-pending related application Serial No. 416,757, which has issued as Patent No. 2,388,261, I have described a method for solubilizing riboflavin by the formation of a riboflavin-boron complex. These boron compositions have proven highly satisfactory as they employ minimum amounts of injection fluid and provide practical means for the administration of riboflavin in desired therapeutic doses.

During the research work carried out on this investigation I also discovered that nicotinamide and water soluble salts of nicotinic acid solubilized polyhydroxyisoalloxazines such as riboflavin. With continued investigation including assay tests running over relatively long periods of time I discovered that these compositions possessed the desired physical stability but lacked the essential chemical or physiological stability. Extensive tests, for example, showed riboflavin-nicotinamide or -sodium nicotinate solutions to be unsatisfactory for use after standing for several weeks or months due to loss in vitamin potency.

The principal object of the present invention is to provide polyhydroxyisoalloxazine and particularly riboflavin solutions of desired concentrations characterized by both physical and physiological stability.

Other objects will be apparent as the detailed description hereinafter proceeds.

I have discovered that riboflavin-nicotinamide solutions may be physiologically stabilized by adjusting the pH value of the solutions to 2.6 to 6.6, and preferably from about 4 to 6.6. The following examples will serve to illustrate the present invention.

I

| | Per cent w/v |
|---|---|
| Riboflavin | 0.10 |
| Nicotinamide | 5.00 |

The above ingredients are mixed with chemically pure water and the mixture warmed until solution is complete. The solution is then cooled and sufficient acidic material, such as hydrochloric acid, added to adjust the pH to about 4.5 to 6.6.

II

| | Per cent w/v |
|---|---|
| Riboflavin | 0.10 |
| Nicotinamide | 5.00 |
| Thiamine hydrochloride | 0.50 |

The above ingredients are mixed with about 80 per cent of the total volume of water required in the formula and solution induced by warming. When solution is complete the resulting solution is allowed to cool and sufficient acidic material such as monosodium dihydrogen phosphate, added to adjust the pH to about 4 to 5.0. The final solution is then made up by addition of chemically pure water. In certain cases, for example, when preparing compositions containing thiamin for oral administration the use of a pH of 2.6 to 4 is preferred.

The present invention is not limited to the above examples. For example, in place of the acidic materials described above other acidic buffers which are not objectional for parenteral injection, such as phosphoric acid, and the like may be used. In addition to thiamin, other vitamins, such as pyridoxine and salts of pantothenic acid, may also be added as desired. The following example is illustrative.

III

| | Per cent w/v |
|---|---|
| Riboflavin | 0.3 |
| Nicotinamide | 10.0 |
| Thiamin hydrochloride | 1.0 |
| Pyridoxine hydrochloride | 0.1 |
| Calcium pantothenate | 1.0 |
| Boric acid | 0.5 |

The riboflavin, nicotinamide and acid ingredients of this example are preferably first mixed together in about 80 cc. of water and solution induced by warming. After solution the other ingredients are added and the resulting solution then made up to 100 cc. by addition of distilled water. In this example, which has a pH of about 4–5, the ratio is 0.03% riboflavin to 1.0% nicotinamide. This represents a 50% increase in riboflavin over the riboflavin-nicotinamide ratio in Examples I and II. Increase in riboflavin was found possible by the discovery that the other vitamin ingredients used in this example are characterized by valuable additive riboflavin solubilizing effects. The solubilizing action of boric acid is also effective in Example III.

During the research investigation in this field, I discovered that nicotinamide possessed unique solubilizing effects when used in relatively high concentrations. I discovered, for example, that while 5 per cent nicotinamide solubilized 0.1 per cent riboflavin at pH 5.0, 10 per cent nicotinamide solubilized 0.28 per cent riboflavin at pH 5 instead of 0.2 per cent as reported in early investigations. I also discovered that 20 per cent, 30 per cent, 40 per cent and 50 per cent nicotinamide at pH 5 solubilized about 0.6 per cent, 1 per cent, 1.6 per cent and 2.5 per cent riboflavin, respectively. These discoveries were unexpected for early investigations with relatively low concentrations of nicotinamide, i. e., up to 10 per cent as illustrated above, had indicated that doubling the percentage of nicotinamide merely doubled the percentage of dissolved riboflavin. However, the above figures (which are given as % w/v) show that the amount of riboflavin solubilized is increased about 2.8, 6, 10, 16 and 25 times by using 2, 4, 6, 8 and 10 times, respectively, the initial amount, i. e. 5 per cent, of nicotinamide. The following example will serve to further illustrate the present invention.

IV

|  | Per cent w/v |
|---|---|
| Riboflavin | 0.6 |
| Nicotinamide | 20.0 |

The above ingredients are dissolved with heating in water in the usual manner. When solution is complete about 0.2 per cent of a concentrated solution of hydrochloric acid is added to bring the pH of the final solution to about 5.0. If desired, about 0.5 per cent boric acid may be added as this ingredient in addition to its solubilizing effects, has also been found to be an excellent physiologically inert bacteriostatic agent for use in the therapeutic solutions of the present invention.

After discovering the importance of pH control in riboflavin-nicotinamide solutions with regard to the physiological stability of riboflavin, I made the further discovery that pH control in the acid pH range is essential to control of solubility or physical stability. For instance 5 per cent nicotinamide will solubilize about 0.1 per cent riboflavin at about pH 4.3 and above, but as the pH is lowered by addition of acid a progressive decrease in riboflavin solubility occurs. Thus at about pH 4.05, 3.6, 3.2, 3.0 and 2.5, 5 per cent nicotinamide will solubilize about 0.095 per cent, 0.07 per cent, 0.056 per cent, 0.044 per cent and 0.032 per cent riboflavin, respectively. Likewise, solutions of 10 per cent, 20 per cent and 30 per cent nicotinamide were found to have decreasing capacity to solubilize riboflavin as the pH was lowered below about pH 5. The decrease in solubilizing capacity of nicotinamide for riboflavin with decrease in pH is apparently related to salt formation between electropositive nicotinamide and electronegative acid anions. This appears likely because the pH curve of electrometric titration of nicotinamide follows the riboflavin solubility curve closely. For example, a 10 per cent solution of nicotinamide hydrochloride, the salt formed between molecular equivalents of nicotinamide and hydrochloric acid, has a pH of 2.0 and has a low solubilizing capacity for riboflavin. Thus while the pH range which can be used to obtain physiological stability is 2.6–6.6, the range which can be used to the greatest advantage from the standpoint of both physiological and physical stability (high solubility) falls roughly between pH 4 and pH 6.6.

The acidic solutions of the present invention contain the riboflavin in desired concentrations and of utmost importance retain their physiological potency over long periods of time. In order to retain therapeutic potency in the present compositions the acidic material should be sufficient to lower the pH not only below the alkaline limit but also below the neutral point or pH 7. Any acidic material which is substantially nontoxic at the concentration employed may be used.

Tests show that alkaline riboflavin nicotinamide solutions lose from about 33 to 100 per cent of their riboflavin potency on standing for several months to a year at room temperatures. Tests also show that neutral solutions lose from about 15 to 30 per cent of their potency under similar conditions. While solutions of this latter type having a pH of 7 or slightly below come within the range of usable compositions, experiments have demonstrated that such solutions must be used shortly after preparation or, if stored, must be kept at refrigerated temperatures in order to maintain the desired pharmaceutical stability.

The acidic solutions of the present invention make it unnecessary to use the solutions within a relatively short time after preparation and also make it unnecessary to keep the solutions under carefully controlled temperature conditions, i. e. below room temperature. In addition, as the acidic solutions are substantially free from physiological deterioration, the present invention makes it unnecessary in ordinary commercial practice to run frequent biological rechecks for such deterioration.

The riboflavin compositions solubilized by nicotinic acid salts are not stable under the 2.6–6.6 pH range employed in the above nicotinamide solutions. The solutions employing salts, such as the sodium, monoethanolamine, methyl glucamine, etc. nicotinates must be maintained at a pH of about 6 to 6.6.

It will be understood that the present invention is not limited to the above illustrative examples. All modifications of the present invention are intended to be covered by the following claims.

I claim:

1. A therapeutic composition comprising an acidic aqueous solution containing at least about 1 mg. of riboflavin per cc. and at least about 50 mg. of nicotinamide per cc. and a small amount of acidic material sufficient to maintain said solution at a pH of 4 to 6.6.

2. A therapeutic solution comprising an acidic aqueous solution containing more than 0.2 per cent riboflavin and more than 10 per cent nicotinamide, said solution having a pH of 4–6.6.

3. Therapeutic compositions comprising acidic aqueous solutions containing percentages of riboflavin ranging from 0.2 per cent to 2.5 per cent and nicotinamide ranging from 10 per cent to 50 per cent respectively, said solutions having a pH of 4–6.6.

4. The process of stabilizing an aqueous riboflavin-nicotinamide solution which comprises adjusting the pH of the solution by means of acidic material to a value of about 4 to 6.6.

5. A stable therapeutic preparation comprising an aqueous solution having a pH of 4–6.6 and containing riboflavin and a solubilizing agent consisting of nicotinamide, the nicotinamide being present in amounts between 10% and 50%; the riboflavin present being not less than 2% of the nicotinamide present.

6. A stable therapeutic preparation comprising an aqueous solution having a pH of 4–6.6 and containing riboflavin and a solubilizing agent consisting of nicotinamide, the nicotinamide being present in amounts between 30% and 50%; the riboflavin present being not less than 3.3% of the nicotinamide present.

7. A therapeutic composition for parenteral use and stable for a time period of a year or so comprising an aqueous solution containing riboflavin in excess of 0.013%; said solution containing also nicotinamide to solubilize the riboflavin; and sufficient acidic material to adjust and maintain the pH of the solution at values between 2.6 and 6.6.

8. A therapeutic composition for parenteral use and stable for a time period of a year or so comprising an aqueous solution containing riboflavin in excess of 0.013%; said solution containing also nicotinamide to solubilize the riboflavin; and sufficient hydrochloric acid to adjust and maintain the pH of the solution at values between 2.6 and 6.6.

9. A therapeutic composition for parenteral use and stable for a time period of a year or so comprising an aqueous solution containing riboflavin in excess of 0.013%; said solution containing also nicotinamide to solubilize the riboflavin; and sufficient monosodium dihydrogen phosphate to adjust and maintain the pH of the solution at values between 2.6 and 6.6.

10. The process of stabilizing an aqueous riboflavin solution to prevent decomposition over a time period of a year or so, and to retain the riboflavin in solution for the same period, which comprises: adding nicotinamide to prevent precipitation; and preventing decomposition by the addition of sufficient acidic material to maintain the pH at about 4.5.

DOUGLAS V. FROST.